US006602454B2

(12) United States Patent
McGuire et al.

(10) Patent No.: US 6,602,454 B2
(45) Date of Patent: Aug. 5, 2003

(54) HIGH SPEED EMBOSSING AND ADHESIVE PRINTING PROCESS AND APPARATUS

(75) Inventors: Kenneth S. McGuire, Wyoming, OH (US); Stephan Gary Bush, Sharonville, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 189 days.

(21) Appl. No.: 09/758,753

(22) Filed: Jan. 11, 2001

(65) Prior Publication Data

US 2002/0171168 A1 Nov. 21, 2002

Related U.S. Application Data

(63) Continuation of application No. 09/289,222, filed on Apr. 9, 1999, now Pat. No. 6,193,918.

(51) Int. Cl.[7] .......................... B29C 47/06; B29C 59/04

(52) U.S. Cl. ................... 264/167; 264/171.13; 264/286

(58) Field of Search ............................ 264/167, 171.13, 264/286

(56) References Cited

U.S. PATENT DOCUMENTS

| | | | |
|---|---|---|---|
| 680,533 | A | 8/1901 | Marinier et al. |
| 690,822 | A | 1/1902 | Avril |
| 1,358,891 | A | 11/1920 | Steedman |

(List continued on next page.)

FOREIGN PATENT DOCUMENTS

| | | |
|---|---|---|
| BE | 570960 | 9/1958 |
| EP | 0037101 A1 | 10/1981 |
| EP | 0621082 A1 | 10/1994 |
| EP | 0623332 A1 | 11/1994 |
| FR | 1315903 | 12/1962 |
| FR | 1429312 | 1/1966 |
| GB | 975783 | 11/1964 |
| GB | 1069445 | 5/1967 |
| WO | WO 92/00187 | 1/1992 |
| WO | WO 95/11945 | 5/1995 |
| WO | WO 95/31225 | 11/1995 |
| WO | WO 96/31652 | 10/1996 |
| WO | WO 97/18276 | 5/1997 |

OTHER PUBLICATIONS

Translation of Japan 3–002,292 (Jan. 8, 1991).
Abstract of Japan 7–246216 (Sep. 26, 1995).
Abstract of Japan 2–303822 (Dec. 17, 1990).
Abstract of Japan 7–266526 (Oct. 17, 1995).
Martin Gardner—"Penrose Tiles to Trapdoor Ciphers", Chapter 1 Penrose Tiling, pp. 1–18; (Pub. Mathematical Assn. Of America—(1997).

(List continued on next page.)

*Primary Examiner*—Leo B. Tentoni
(74) *Attorney, Agent, or Firm*—Peter D. Meyer

(57) ABSTRACT

The present invention provides a process which in a preferred embodiment includes the steps of. (a) applying a hot melt adhesive to a heated roll rotating at an initial tangential speed; (b) milling the adhesive to a reduced thickness and accelerating said adhesive through a series of metering gaps between a plurality of adjacent heated glue rolls; (c) applying the adhesive to a conformable glue application roll rotating at a tangential line speed which is higher than the initial tangential speed; (d) applying the adhesive to a first patterned embossing roll which is engaged with a second patterned embossing roll having a complementary pattern to the first embossing roll, the embossing rolls being heated; (e) passing a web of sheet material between the first and second embossing rolls at the tangential line speed to simultaneously emboss the web and apply the adhesive to the web, such that the adhesive forms an adhesive pattern between embossments; (f) transferring the web from the second embossing roll to the first embossing roll; (g) stripping the web from the first embossing roll; and (h) cooling the web.

19 Claims, 5 Drawing Sheets

U.S. PATENT DOCUMENTS

| | | | |
|---|---|---|---|
| 1,454,364 | A | 5/1923 | Winchenbaugh et al. |
| 2,054,313 | A | 9/1936 | Bright |
| 2,338,749 | A | 1/1944 | Wilbur |
| 2,681,612 | A | 6/1954 | Reimann |
| 2,838,416 | A | 6/1958 | Babiarz et al. |
| 2,855,844 | A | 10/1958 | Stewart |
| 2,861,006 | A | 11/1958 | Salditt |
| 3,018,015 | A | 1/1962 | Agriss et al. |
| 3,024,154 | A | 3/1962 | Singleton et al. |
| 3,312,005 | A | 4/1967 | McElroy |
| 3,386,846 | A | 6/1968 | Lones |
| 3,484,835 | A | 12/1969 | Trounstine et al. |
| 3,554,835 | A | 1/1971 | Morgan |
| 3,573,136 | A | 3/1971 | Gardner |
| 3,585,101 | A | 6/1971 | Stratton et al. |
| 3,592,722 | A | 7/1971 | Morgan |
| 3,708,366 | A | 1/1973 | Donnelly |
| 3,850,095 | A | 11/1974 | Snyder |
| 3,853,129 | A | 12/1974 | Kozak |
| 3,867,225 | A | 2/1975 | Nystrand |
| 3,879,330 | A | 4/1975 | Lustig |
| 3,901,237 | A | 8/1975 | Cepuritis et al. |
| 3,911,187 | A | 10/1975 | Raley |
| 3,937,221 | A | 2/1976 | Tritsch |
| 3,943,609 | A | 3/1976 | Egan, Jr. |
| 3,950,480 | A | 4/1976 | Adams et al. |
| 3,967,624 | A | 7/1976 | Milnamow |
| 4,023,570 | A | 5/1977 | Chinai et al. |
| 4,054,697 | A | 10/1977 | Reed et al. |
| 4,061,820 | A | 12/1977 | Magid et al. |
| 4,067,337 | A | 1/1978 | Ness |
| 4,133,152 | A | 1/1979 | Penrose |
| 4,181,752 | A | 1/1980 | Martens et al. |
| 4,273,889 | A | 6/1981 | Yamazaki et al. |
| 4,303,485 | A | 12/1981 | Levens |
| 4,325,768 | A | 4/1982 | Schulz |
| 4,336,804 | A | 6/1982 | Roeder |
| 4,337,772 | A | 7/1982 | Roeder |
| 4,339,088 | A | 7/1982 | Niedermeyer |
| 4,342,314 | A | 8/1982 | Radel et al. |
| 4,376,147 | A | 3/1983 | Byrne et al. |
| 4,376,440 | A | 3/1983 | Whitehead et al. |
| 4,392,897 | A | 7/1983 | Herrington |
| 4,397,905 | A | 8/1983 | Dettmer et al. |
| 4,404,242 | A | 9/1983 | Squier |
| 4,405,666 | A | 9/1983 | Squier |
| 4,410,130 | A | 10/1983 | Herrington |
| 4,413,109 | A | 11/1983 | Haas |
| 4,460,634 | A | 7/1984 | Hasegawa |
| 4,508,256 | A | 4/1985 | Radel et al. |
| 4,509,908 | A | 4/1985 | Mullane, Jr. |
| 4,514,345 | A | 4/1985 | Johnson et al. |
| 4,519,095 | A | 5/1985 | Clayton |
| 4,528,239 | A | 7/1985 | Trokhan |
| 4,543,142 | A | 9/1985 | Kuepper et al. |
| 4,546,029 | A | 10/1985 | Cancio et al. |
| 4,556,595 | A | 12/1985 | Ochi |
| 4,576,850 | A | 3/1986 | Martens |
| 4,578,069 | A | 3/1986 | Whitehead et al. |
| 4,587,152 | A | 5/1986 | Gleichenhagen et al. |
| 4,612,221 | A | 9/1986 | Biel et al. |
| 4,655,761 | A | 4/1987 | Grube et al. |
| 4,659,608 | A | 4/1987 | Schulz |
| 4,695,422 | A | 9/1987 | Curro et al. |
| 4,699,622 | A | 10/1987 | Toussant et al. |
| 4,743,242 | A | 5/1988 | Grube et al. |
| 4,778,644 | A | 10/1988 | Curro et al. |
| 4,803,032 | A | 2/1989 | Schulz |
| 4,820,589 | A | 4/1989 | Dobreski et al. |
| 4,839,216 | A | 6/1989 | Curro et al. |
| 4,894,275 | A | 1/1990 | Pelzer |
| 4,946,527 | A | 8/1990 | Battrell |
| 4,959,265 | A | 9/1990 | Wood et al. |
| 5,008,139 | A | 4/1991 | Ochi et al. |
| 5,080,957 | A | 1/1992 | Leseman et al. |
| 5,098,522 | A | 3/1992 | Smurkoski et al. |
| 5,112,674 | A | 5/1992 | German et al. |
| 5,116,677 | A | 5/1992 | Jones |
| 5,141,790 | A | 8/1992 | Calhoun et al. |
| 5,165,982 | A | 11/1992 | Gubitz et al. |
| D331,665 | S | 12/1992 | Underhill |
| 5,175,049 | A | 12/1992 | Huff et al. |
| 5,176,939 | A | 1/1993 | Shepherd |
| 5,208,096 | A | 5/1993 | Dohrer |
| 5,215,617 | A | 6/1993 | Grupe |
| 5,215,804 | A | 6/1993 | Hagens et al. |
| 5,221,276 | A | 6/1993 | Battrell |
| 5,245,025 | A | 9/1993 | Trokhan et al. |
| 5,246,762 | A | 9/1993 | Nakamura |
| 5,269,776 | A | 12/1993 | Lancaster et al. |
| 5,273,805 | A | 12/1993 | Calhoun et al. |
| 5,273,809 | A | 12/1993 | Simmons |
| 5,275,588 | A | 1/1994 | Matsumoto et al. |
| 5,296,277 | A | 3/1994 | Wilson et al. |
| 5,300,347 | A | 4/1994 | Underhill et al. |
| 5,310,587 | A | 5/1994 | Akahori et al. |
| 5,324,279 | A | 6/1994 | Lancaster et al. |
| 5,334,428 | A | 8/1994 | Dobreski et al. |
| 5,339,730 | A | 8/1994 | Ruppel et al. |
| 5,342,344 | A | 8/1994 | Lancaster et al. |
| 5,344,693 | A | 9/1994 | Sanders |
| 5,382,464 | A | 1/1995 | Ruppel et al. |
| 5,436,057 | A | 7/1995 | Schulz |
| 5,453,296 | A | 9/1995 | Lauritzen et al. |
| 5,458,938 | A | 10/1995 | Nygard et al. |
| 5,487,929 | A | 1/1996 | Rusincovitch, Jr. et al. |
| 5,514,122 | A | 5/1996 | Morris et al. |
| 5,518,801 | A | 5/1996 | Chappell et al. |
| 5,527,112 | A | 6/1996 | Dais et al. |
| D373,026 | S | 8/1996 | Delebreau et al. |
| 5,575,747 | A | 11/1996 | Dais et al. |
| 5,585,178 | A | 12/1996 | Calhoun et al. |
| 5,589,246 | A | 12/1996 | Calhoun et al. |
| 5,597,639 | A | 1/1997 | Schulz |
| 5,622,106 | A | 4/1997 | Rayner |
| D381,810 | S | 8/1997 | Schultz et al. |
| 5,662,758 | A | 9/1997 | Hamilton et al. |
| 5,686,168 | A | 11/1997 | Laurent et al. |
| 5,736,223 | A | 4/1998 | Laurent |
| 5,871,607 | A | 2/1999 | Hamilton et al. |

OTHER PUBLICATIONS

Broughton, J., et al., "Porous Cellular Ceramic Membranes: A Stochastic Model To Describe the Structure of an Anodic Oxide Membrane", Journal of Membrane Science 106, pp. 89–101 (1995).

Lim, J.H.F., et al., "Statistical Models to Describe the Structure of Porous Ceramic Membranes", Separation Science and Technology, 28 (1–3), pp. 821–854 (1993).

Watson, D.F., "Computing the n–dimensional Delaunay Tessellation with Application to Voronoi Polytopes", The Computer Journal, vol. 24, No. 2, pp. 167–172 (1981).

HIGH SPEED EMBOSSING AND ADHESIVE PRINTING PROCESS AND APPARATUS

This application is a continuation of application Ser. No. 09/289,222, filed on Apr. 9, 1999, now U.S. Pat. No. 6,193,918 B1.

FIELD OF THE INVENTION

The present invention relates to processes and equipment for embossing and applying adhesive to thin film webs.

BACKGROUND OF THE INVENTION

Three-dimensional sheet materials which include a thin layer of pressure-sensitive adhesive protected from inadvertent contact, as well as methods and apparatus for manufacturing them, have been developed and are described in detail in commonly-assigned U.S. Pat. No. 5,662,758, issued Sep. 2, 1997 to Hamilton and McGuire, entitled "Composite Material Releasably Sealable to a Target Surface When Pressed Thereagainst and Method of Making", and U.S. Pat. No. 5,871,607, issued Feb. 16, 1999 to Hamilton and McGuire, entitled "Material Having A Substance Protected by Deformable Standoffs and Method of Making", and commonly-assigned, co-pending U.S. patent application Ser. No. 08/745,339, filed Nov. 8, 1996 in the names of McGuire, Tweddell, and Hamilton, entitled "Three-Dimensional, Nesting-Resistant Sheet Materials and Method and Apparatus for Making Same", now U.S. Pat. No. 5,695,235, 08/745,340, filed Nov. 8, 1996 in the names of Hamilton and McGuire, entitled "Improved Storage Wrap Materials", all of which are hereby incorporated herein by reference.

While the processes and equipment for manufacturing such materials described in these applications/patents are suitable for manufacturing such materials on a comparatively small scale, the nature of the processes and equipment have been found to be rate-limiting by design. Said differently, the maximum speed at which such processes and equipment can be operated to produce such materials is limited by the size or weight of moving components, the rate at which heat can be applied to deformable substrate materials, the rate at which forces can be imparted to the substrate to deform it into the desired configuration, and/or the rate at which adhesive can be applied to the substrate and/or intermediate apparatus elements. The speed at which such processes and apparatus can be operated is a major factor in the economics of producing such materials on a commercial scale.

Accordingly, it would be desirable to provide a process and apparatus suitable for forming such three-dimensional sheet materials and applying adhesive at high speed.

SUMMARY OF THE INVENTION

The present invention provides a process which in a preferred embodiment includes the steps of. (a) applying a hot melt adhesive to a heated roll rotating at an initial tangential speed; (b) milling the adhesive to a reduced thickness and accelerating said adhesive through a series of metering gaps between a plurality of adjacent heated glue rolls; (c) applying the adhesive to a conformable glue application roll rotating at a tangential line speed which is higher than the initial tangential speed; (d) applying the adhesive to a first patterned embossing roll which is engaged with a second patterned embossing roll having a complementary pattern to the first embossing roll, the embossing rolls being heated; (e) passing a web of sheet material between the first and second embossing rolls at the tangential line speed to simultaneously emboss the web and apply the adhesive to the web, such that the adhesive forms an adhesive pattern between embossments; (f) transferring the web from the second embossing roll to the first embossing roll; (g) stripping the web from the first embossing roll; and (h) cooling the web.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

DETAILED DESCRIPTION OF THE INVENTION

Process and Apparatus

Figure 1:
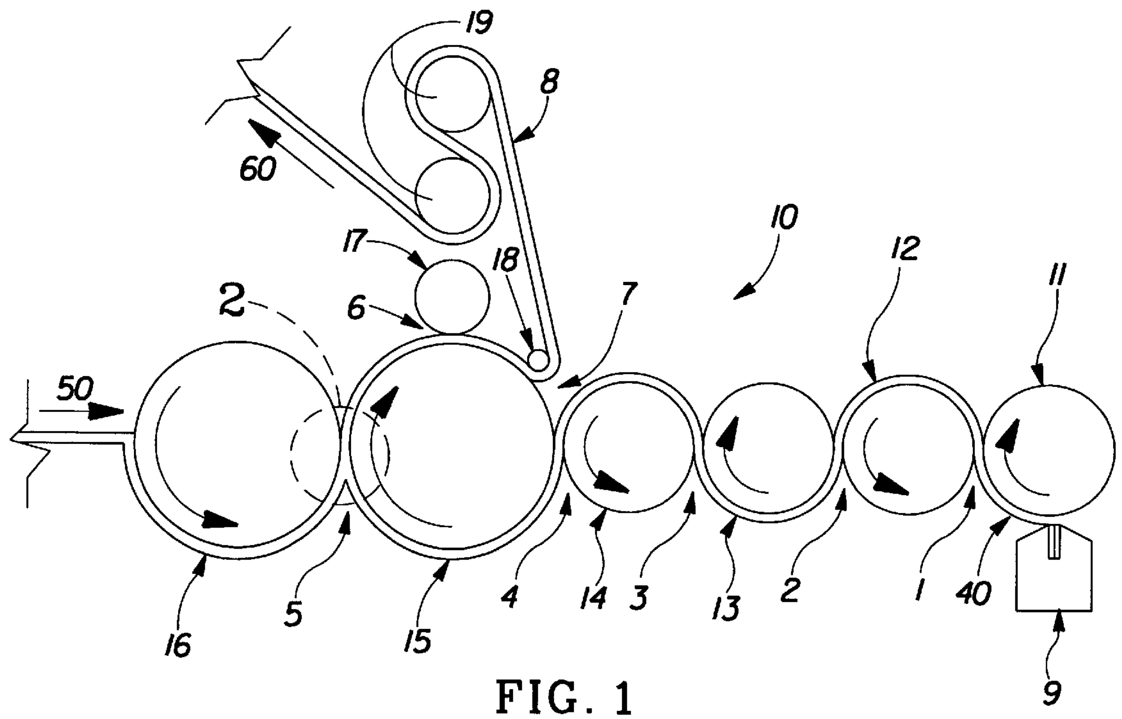
FIG. 1 is a schematic illustration of the process and apparatus according to the present invention.
Figure 2:
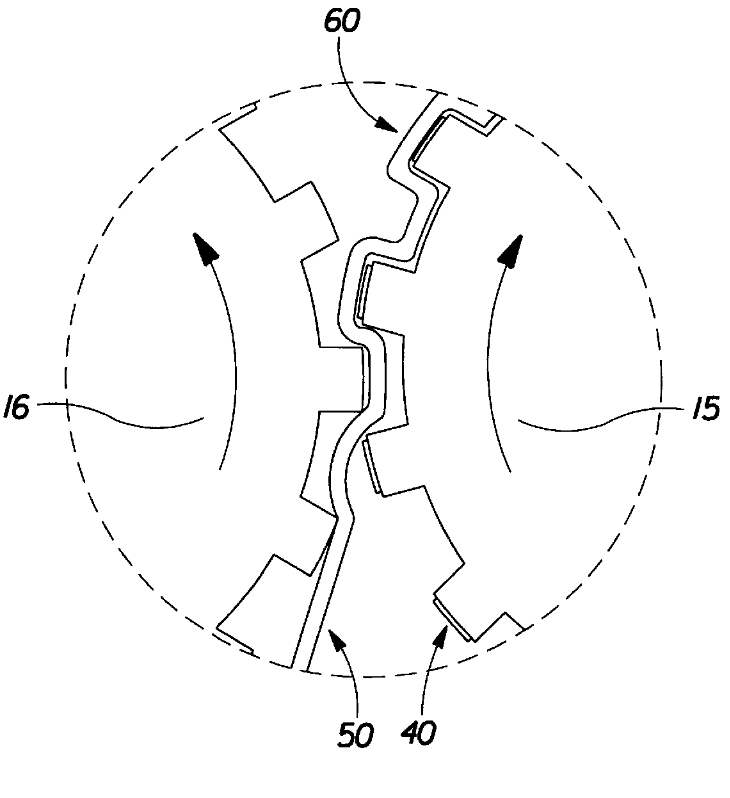
FIG. 2 is an enlarged partial view of the apparatus of FIG. 1 illustrating the adhesive transfer step between the embossing rolls.

FIG. 1 illustrates in schematic form the process and apparatus 10 of the present invention. The apparatus is composed fundamentally of two mated embossing rolls 15 and 16, multiple glue metering/application rolls 11–14, a pressure roll 17, a strip-off roll 18, and a chilled S-wrap 19. The embossing rolls are steel, with a matched embossing pattern etched into them which interlocks to emboss a web of sheet material passed therebetween. The roll with pockets and raised lands is referred to as the female embossing roll 15, while the roll with raised nubs and recessed lands is referred to as the male embossing roll 16. The female embossing roll preferably has a release coating applied to its surface. The glue application/metering rolls 11–14 typically alternate between being plain steel or rubber-coated steel. The glue application roll 14 (the last roll in the glue system) is always rubber coated steel. The pressure roll 17 and strip off roll 18 are also rubber coated steel. The chilled S-wrap is composed of hollow steel rolls 19 with a release coating on their outside surfaces and coolant flowing through the rolls. The direction of roll rotation is shown in FIG. 1 with arrows.

More specifically, with reference to FIG. 1, an adhesive (such as a hot melt pressure sensitive adhesive) 40 is extruded onto the surface of the first rotating roll 11 via a heated slot die 9. The slot die is supplied by a hot melt supply system (with a heated hopper and variable speed gear pump, not shown) through a heated hose. The surface speed of the first of the glue metering rolls 11 is considerably slower than the nominal tangential line speed of the web of sheet material 50 to be embossed and adhesive-coated. The metering nips are shown in FIG. 1 as stations 1, 2, and 3. The remaining glue metering rolls 12–14 rotate progressively faster so that the glue application nip, station 4, is surface speed matched. The glue 40 is transferred from the glue application roll 14 to the female embossing roll 15 at station 4. The glue 40 travels with the female embossing roll surface to station 5, where it is combined with the polymer web 50 which is carried into station 5 via male embossing roll 16.

At station 5, the polymer web 50 is embossed and combined with the glue 40 simultaneously to form an adhesive coated web 60. The web 60, glued to the surface of roll 15, travels with the roll surface to station 6, where a rubber coated pressure roll 17 applies pressure to the glued portion of the web. The web 60, still glued to the female embossing roll 15, travels to station 7, where it is stripped off the female embossing roll 15 via strip-off roll 18. The finished adhesive-coated web 60 then travels to the chilled S-wrap 19 at station 8, where it is cooled to increase its strength.

The adhesive (or glue) 40 is applied to the land areas of the female embossing roll 15 only. This is accomplished by carefully controlling the female embossing roll to glue application roll clearance and runout at station 4. The gap between these rolls is controlled such that the glue covered rubber roll 14 applies glue to the lands only, without pressing the glue into the recesses or pockets between lands.

The glue application roll 14 is a rubber coated steel roll. The rubber coating is ground in a special process to achieve approximately 0.001 inches TIR runout tolerance. The nip is controlled in the machine with precision wedge blocks. A rubber coating is utilized to (1) protect the coating on the female embossing roll 15 from damage due to metal-to-metal contact and (2) to allow the glue application roll to be very lightly pressed against the female embossing roll, so that the deflection of the rubber compensates for the actual runout of the embossing roll and glue application roll, allowing glue to be applied everywhere evenly on the female embossing roll lands.

The glue application roll 14 is lightly pressed against the female embossing roll 15 such that the deflection of the rubber surface compensates for embossing roll and glue application roll runout, but the deflection is not so high as to press glue into the pockets in the surface of the female embossing roll 15. Deposition of glue exclusively onto the lands of the female embossing roll 15 is essential to prevent glue from being transferred onto the tops of the embossments in the web. Adhesive present on the tops of the embossments would cause them to exhibit adhesive properties prior to activation of the web via crushing of the embossments.

The adhesive or glue utilized is highly elastic in nature, and a transition from a stationary slot die 9 to full tangential line speed can result in the glue being extended and fractured, or in non-adhesion to the first metering roll. To reduce the extension rate of the glue, it is applied first to a slow moving roll and then through a series of metering gaps (stations 1, 2, and 3) it is milled down to a very thin glue film and accelerated at the desired tangential line speed.

The glue rolls must be ground to exacting tolerances for diameter and runout to maintain the precise inter-roll gap dimensions required for glue metering and acceleration. Typical runout tolerance is 0.00005 inches TIR. The glue rolls must be heated uniformly circumferentially and across the machine direction to avoid thermally-induced crown or runout of the rolls. It has been found that, in the case of electrically heated rolls, a single heater failure can create enough runout to prevent uniform glue printing onto the web. In such a case, ammeters are used to indicate heater failures. Heat loss through bearings and roll shafts can create roll crown, which also prevents uniform glue printing. Often the roll's bearing blocks must be heated to prevent temperature gradients in the cross machine direction.

The female embossing roll 15 preferably includes a release coating applied to both the land surfaces and to the surfaces of the pockets or recesses therebetween. The release coating and the glue properties must be carefully balanced to provide the best combination of adhesion and release. The coating must allow the very hot (typically 300–350° F.) glue to transfer to the female embossing roll and yet allow the adhesive-coated polymer film web to release at the embossing roll temperature (typically 160–180° F.). If the release coating promotes too little adhesion, the glue will not transfer from the glue application roll to the female embossing roll, while if the release coating promotes too much adhesion, the final adhesive-coated web cannot be removed from the surface of the female embossing roll without tearing or stretching the polymer film.

The film should be embossed at the highest possible embossing temperature to promote crisp, high-caliper embossments and allow the glued film web to release from the female embossing roll with lower strip-off force. However, the temperature of the embossing rolls must be kept below the softening point of the film web so that the final adhesively-coated web will have sufficient tensile strength to be removed from the female embossing roll. A balance between release temperature and film softening temperature has been found to be a critical parameter in defining successful operating conditions for operating at high speeds.

The strip-off roll assists in removing the final product from the female embossing roll without damaging the film. Since the product (film web) is glued to the surface of the female embossing roll, very high forces can be developed at the strip-off point. The strip off roll localizes these high forces to a very short length of web, resulting in less distortion of the web and more control over the strip-off angle. Preventing distortion of the final product is essential to provide consistent film properties and prevent the film from having regions which are prematurely activated to exhibit adhesive properties.

The amount or degree of engagement between the male and female embossing rolls must be carefully controlled to prevent damage to the rolls or to the film web. The outside surfaces of the embossing rolls are ground to a 0.00005 inch TIR runout tolerance. The engagement is controlled in the machine with precision wedge blocks. The engagement of the embossing rolls governs the final caliper of the film (i.e., the final height of the embossments).

Another important criteria is the fit or correspondence between the male and female embossing rolls. One useful technique is to form one roll via a photoetching process and utilize this roll as a "master" to form the other roll as a negative image. The equipment must also be designed so as to maintain precise synchronization of the mating embossing rolls.

The embossing and glue rolls are all individually heated and controlled to allow precise control of glue transfer temperatures and embossing roll release temperature.

The use of mating male and female embossing rolls of complementary pattern shapes fully supports the thin film web during the embossing and adhesive process step to ensure that the forces are properly distributed within the film material. Full support of the web, as opposed to thermoforming or vacuum forming a film with an open support structure such as an apertured belt or drum wherein the portion of the web being deformed into the apertures or recesses is unsupported, is believed to allow an increase in the rate at which strains are imparted to the web without damage to the web and thus allow for higher production speeds. The simultaneous application of the adhesive to the film during the embossing step provides precise registration of the adhesive on the undeformed portions of the web between embossments.

Precise control over the adhesive, particularly the thickness and uniformity of the adhesive layer applied to the female embossing roll, is an important factor in producing a high quality product at high speed. Especially in the case of very low add-on levels of adhesive, even slight variations in the thickness of the adhesive during transfers from roll to roll can result in coverage gaps by the time the adhesive is applied to the embossing roll. At the same time, such variations can lead to excess adhesive in certain regions of the embossing roll which could either contaminate the recesses in the roll or result in incomplete adhesive transfer to the web and a buildup of adhesive on the embossing roll.

Pattern Generation

Figure 3:
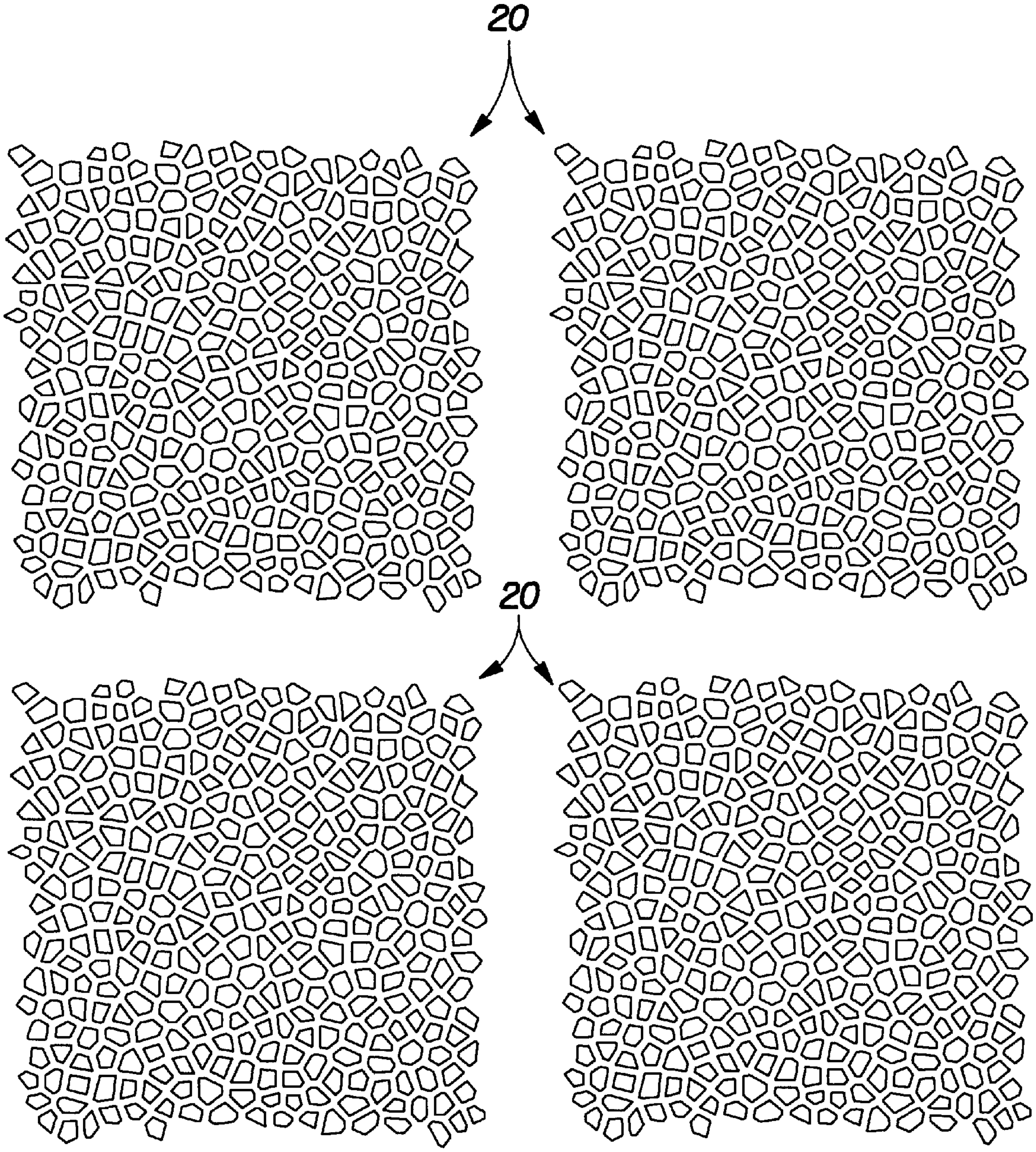
FIG. 3 is a plan view of four identical "tiles" of a representative embodiment of an amorphous pattern useful with the present invention.
Figure 4:
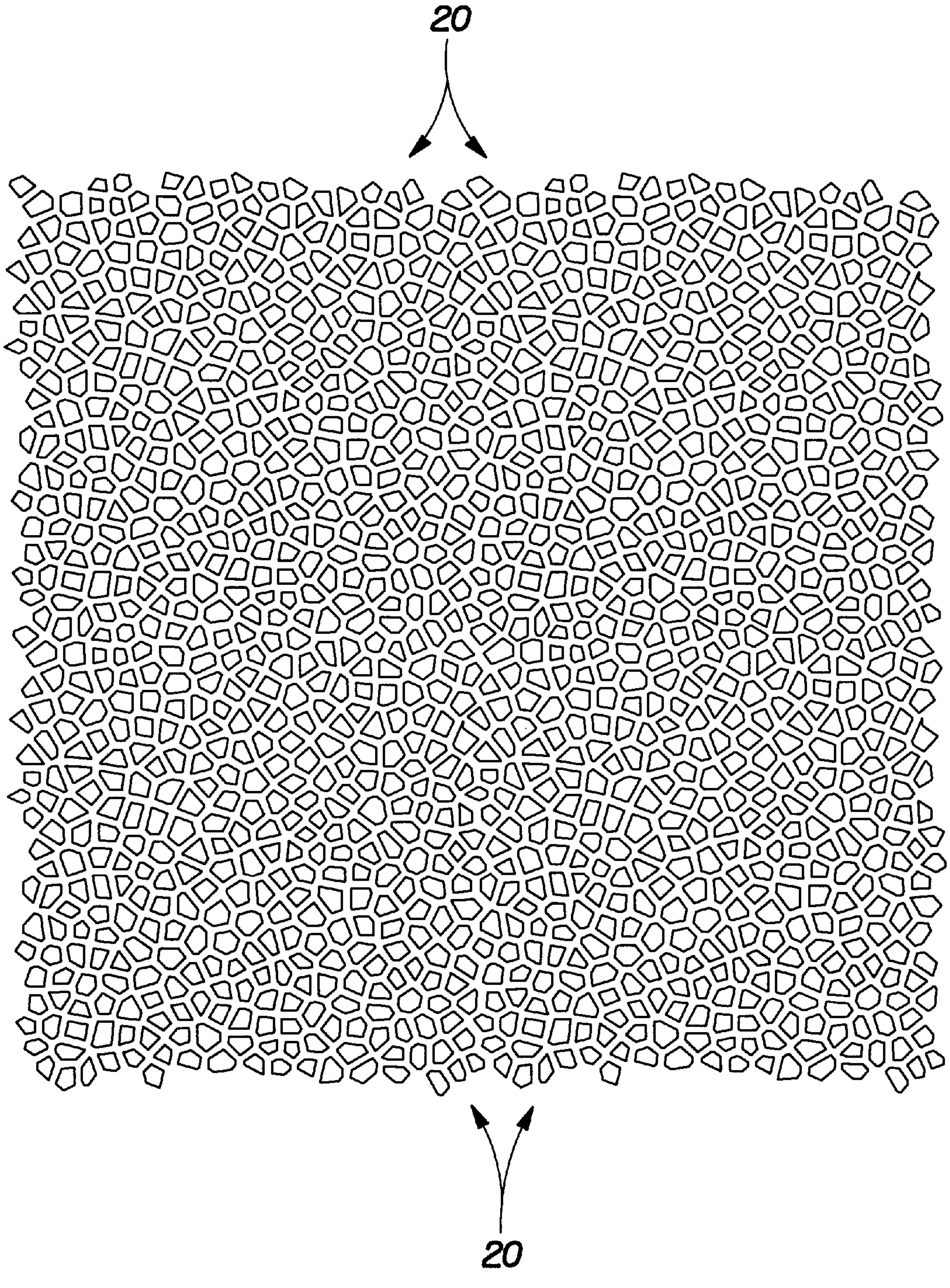
FIG. 4 is a plan view of the four "tiles" of FIG. 3 moved into closer proximity to illustrate the matching of the pattern edges.

FIGS. 3 and 4 show a pattern 20 created using an algorithm described in greater detail in commonly-assigned, co-pending U.S. patent application Ser. No. 09/288,786, filed Apr. 9, 1999, in the name of Kenneth S. McGuire, entitled "Method of Seaming and Expanding Amorphous Patterns", the disclosure of which is hereby incorporated herein by reference. It is obvious from FIGS. 3 and 4 that there is no appearance of a seam at the borders of the tiles 20 when they are brought into close proximity. Likewise, if opposite edges of a single pattern or tile were brought together, such as by wrapping the pattern around a belt or roll, the seam would likewise not be readily visually discernible.

As utilized herein, the term "amorphous" refers to a pattern which exhibits no readily perceptible organization, regularity, or orientation of constituent elements. This definition of the term "amorphous" is generally in accordance with the ordinary meaning of the term as evidenced by the corresponding definition in *Webster's Ninth New Collegiate Dictionary.* In such a pattern, the orientation and arrangement of one element with regard to a neighboring element bear no predictable relationship to that of the next succeeding element(s) beyond.

By way of contrast, the term "array" is utilized herein to refer to patterns of constituent elements which exhibit a regular, ordered grouping or arrangement. This definition of the term "array" is likewise generally in accordance with the ordinary meaning of the term as evidenced by the corresponding definition in *Webster's Ninth New Collegiate Dictionary.* In such an array pattern, the orientation and arrangement of one element with regard to a neighboring element bear a predictable relationship to that of the next succeeding element(s) beyond.

The degree to which order is present in an array pattern of three-dimensional protrusions bears a direct relationship to the degree of nestability exhibited by the web. For example, in a highly-ordered array pattern of uniformly-sized and shaped hollow protrusions in a close-packed hexagonal array, each protrusion is literally a repeat of any other protrusion. Nesting of regions of such a web, if not in fact the entire web, can be achieved with a web alignment shift between superimposed webs or web portions of no more than one protrusion-spacing in any given direction. Lesser degrees of order may demonstrate less nesting tendency, although any degree of order is believed to provide some degree of nestability. Accordingly, an amorphous, non-ordered pattern of protrusions would therefore exhibit the greatest possible degree of nesting-resistance.

Three-dimensional sheet materials having a two-dimensional pattern of three-dimensional protrusions which is substantially amorphous in nature are also believed to exhibit "isomorphism". As utilized herein, the terms "isomorphism" and its root "isomorphic" are utilized to refer to substantial uniformity in geometrical and structural properties for a given circumscribed area wherever such an area is delineated within the pattern. This definition of the term "isomorphic" is generally in accordance with the ordinary meaning of the term as evidenced by the corresponding definition in *Webster's Ninth New Collegiate Dictionary.* By way of example, a prescribed area comprising a statistically-significant number of protrusions with regard to the entire amorphous pattern would yield statistically substantially equivalent values for such web properties as protrusion area, number density of protrusions, total protrusion wall length, etc. Such a correlation is believed desirable with respect to physical, structural web properties when uniformity is desired across the web surface, and particularly so with regard to web properties measured normal to the plane of the web such as crush-resistance of protrusions, etc.

Utilization of an amorphous pattern of three-dimensional protrusions has other advantages as well. For example, it has been observed that three-dimensional sheet materials formed from a material which is initially isotropic within the plane of the material remain generally isotropic with respect to physical web properties in directions within the plane of the material. As utilized herein, the term "isotropic" is utilized to refer to web properties which are exhibited to substantially equal degrees in all directions within the plane of the material. This definition of the term "isotropic" is likewise generally in accordance with the ordinary meaning of the term as evidenced by the corresponding definition in *Webster's Ninth New Collegiate Dictionary.* Without wishing to be bound by theory, this is presently believed to be due to the non-ordered, non-oriented arrangement of the three-dimensional protrusions within the amorphous pattern. Conversely, directional web materials exhibiting web properties which vary by web direction will typically exhibit such properties in similar fashion following the introduction of the amorphous pattern upon the material. By way of example, such a sheet of material could exhibit substantially uniform tensile properties in any direction within the plane of the material if the starting material was isotropic in tensile properties.

Such an amorphous pattern in the physical sense translates into a statistically equivalent number of protrusions per unit length measure encountered by a line drawn in any given direction outwardly as a ray from any given point within the pattern. Other statistically equivalent parameters could include number of protrusion walls, average protrusion area, average total space between protrusions, etc. Statistical equivalence in terms of structural geometrical features with regard to directions in the plane of the web is believed to translate into statistical equivalence in terms of directional web properties.

Revisiting the array concept to highlight the distinction between arrays and amorphous patterns, since an array is by definition "ordered" in the physical sense it would exhibit some regularity in the size, shape, spacing, and/or orientation of protrusions. Accordingly, a line or ray drawn from a given point in the pattern would yield statistically different values depending upon the direction in which the ray extends for such parameters as number of protrusion walls, average protrusion area, average total space between protrusions, etc. with a corresponding variation in directional web properties.

Within the preferred amorphous pattern, protrusions will preferably be non-uniform with regard to their size, shape, orientation with respect to the web, and spacing between adjacent protrusion centers. Without wishing to be bound by theory, differences in center-to-center spacing of adjacent protrusions are believed to play an important role in reducing the likelihood of nesting occurring in the face-to-back nesting scenario. Differences in center-to-center spacing of protrusions in the pattern result in the physical sense in the spaces between protrusions being located in different spatial locations with respect to the overall web. Accordingly, the likelihood of a "match" occurring between superimposed portions of one or more webs in terms of protrusions/space locations is quite low. Further, the likelihood of a "match" occurring between a plurality of adjacent protrusions/spaces on superimposed webs or web portions is even lower due to the amorphous nature of the protrusion pattern.

In a completely amorphous pattern, as would be presently preferred, the center-to-center spacing is random, at least within a designer-specified bounded range, such that there is an equal likelihood of the nearest neighbor to a given protrusion occurring at any given angular position within the plane of the web. Other physical geometrical characteristics of the web are also preferably random, or at least non-uniform, within the boundary conditions of the pattern, such as the number of sides of the protrusions, angles included within each protrusion, size of the protrusions, etc. However, while it is possible and in some circumstances desirable to have the spacing between adjacent protrusions be non-uniform and/or random, the selection of polygon shapes which are capable of interlocking together makes a uniform spacing between adjacent protrusions possible. This is particularly useful for some applications of the three-dimensional, nesting-resistant sheet materials of the present invention, as will be discussed hereafter.

As used herein, the term "polygon" (and the adjective form "polygonal") is utilized to refer to a two-dimensional geometrical figure with three or more sides, since a polygon with one or two sides would define a line. Accordingly, triangles, quadrilaterals, pentagons, hexagons, etc. are included within the term "polygon", as would curvilinear shapes such as circles, ellipses, etc. which would have an infinite number of sides.

When describing properties of two-dimensional structures of non-uniform, particularly non-circular, shapes and non-uniform spacing, it is often useful to utilize "average" quantities and/or "equivalent" quantities. For example, in terms of characterizing linear distance relationships between objects in a two-dimensional pattern, where spacings on a center-to-center basis or on an individual spacing basis, an "average" spacing term may be useful to characterize the resulting structure. Other quantities that could be described in terms of averages would include the proportion of surface area occupied by objects, object area, object circumference, object diameter, etc. For other dimensions such as object circumference and object diameter, an approximation can be made for objects which are non-circular by constructing a hypothetical equivalent diameter as is often done in hydraulic contexts.

A totally random pattern of three-dimensional hollow protrusions in a web would, in theory, never exhibit face-to-back nesting since the shape and alignment of each frustum would be unique. However, the design of such a totally random pattern would be very time-consuming and complex proposition, as would be the method of manufacturing a suitable forming structure. In accordance with the present invention, the non-nesting attributes may be obtained by designing patterns or structures where the relationship of adjacent cells or structures to one another is specified, as is the overall geometrical character of the cells or structures, but wherein the precise size, shape, and orientation of the cells or structures is non-uniform and non-repeating. The term "non-repeating", as utilized herein, is intended to refer to patterns or structures where an identical structure or shape is not present at any two locations within a defined area of interest. While there may be more than one protrusion of a given size and shape within the pattern or area of interest, the presence of other protrusions around them of non-uniform size and shape virtually eliminates the possibility of an identical grouping of protrusions being present at multiple locations. Said differently, the pattern of protrusions is non-uniform throughout the area of interest such that no grouping of protrusions within the overall pattern will be the same as any other like grouping of protrusions. The beam strength of the three-dimensional sheet material will prevent significant nesting of any region of material surrounding a given protrusion even in the event that that protrusion finds itself superimposed over a single matching depression since the protrusions surrounding the single protrusion of interest will differ in size, shape, and resultant center-to-center spacing from those surrounding the other protrusion/depression.

Professor Davies of the University of Manchester has been studying porous cellular ceramic membranes and, more particularly, has been generating analytical models of such membranes to permit mathematical modeling to simulate real-world performance. This work was described in greater detail in a publication entitled "Porous cellular ceramic membranes: a stochastic model to describe the structure of an anodic oxide membrane", authored by J. Broughton and G. A. Davies, which appeared in the *Journal of Membrane Science,* Vol. 106 (1995), at pp. 89–101, the disclosure of which is hereby incorporated herein by reference. Other related mathematical modeling techniques are described in greater detail in "Computing the n-dimensional Delaunay tessellation with application to Voronoi polytopes", authored by D. F. Watson, which appeared in *The Computer Journal,* Vol. 24, No. 2 (1981), at pp. 167–172, and "Statistical Models to Describe the Structure of Porous Ceramic Membranes", authored by J. F. F. Lim, X. Jia, R. Jafferali, and G. A. Davies, which appeared in *Separation Science and Technology,* 28(1–3) (1993) at pp. 821–854, the disclosures of both of which are hereby incorporated herein by reference.

As part of this work, Professor Davies developed a two-dimensional polygonal pattern based upon a constrained Voronoi tessellation of 2-space. In such a method, again with reference to the above-identified publication, nucleation points are placed in random positions in a bounded (pre-determined) plane which are equal in number to the number of polygons desired in the finished pattern. A computer program "grows" each point as a circle simultaneously and radially from each nucleation point at equal rates. As growth fronts from neighboring nucleation points meet, growth stops and a boundary line is formed. These boundary lines each form the edge of a polygon, with vertices formed by intersections of boundary lines.

While this theoretical background is useful in understanding how such patterns may be generated and the properties of such patterns, there remains the issue of performing the above numerical repetitions step-wise to propagate the nucleation points outwardly throughout the desired field of interest to completion. Accordingly, to expeditiously carry out this process a computer program is preferably written to perform these calculations given the appropriate boundary conditions and input parameters and deliver the desired output.

The first step in generating a pattern useful in accordance with the present invention is to establish the dimensions of the desired pattern. For example, if it is desired to construct a pattern 10 inches wide and 10 inches long, for optionally forming into a drum or belt as well as a plate, then an X-Y coordinate system is established with the maximum X dimension ($x_{max}$) being 10 inches and the maximum Y dimension ($y_{max}$) being 10 inches (or vice-versa).

Figure 5:
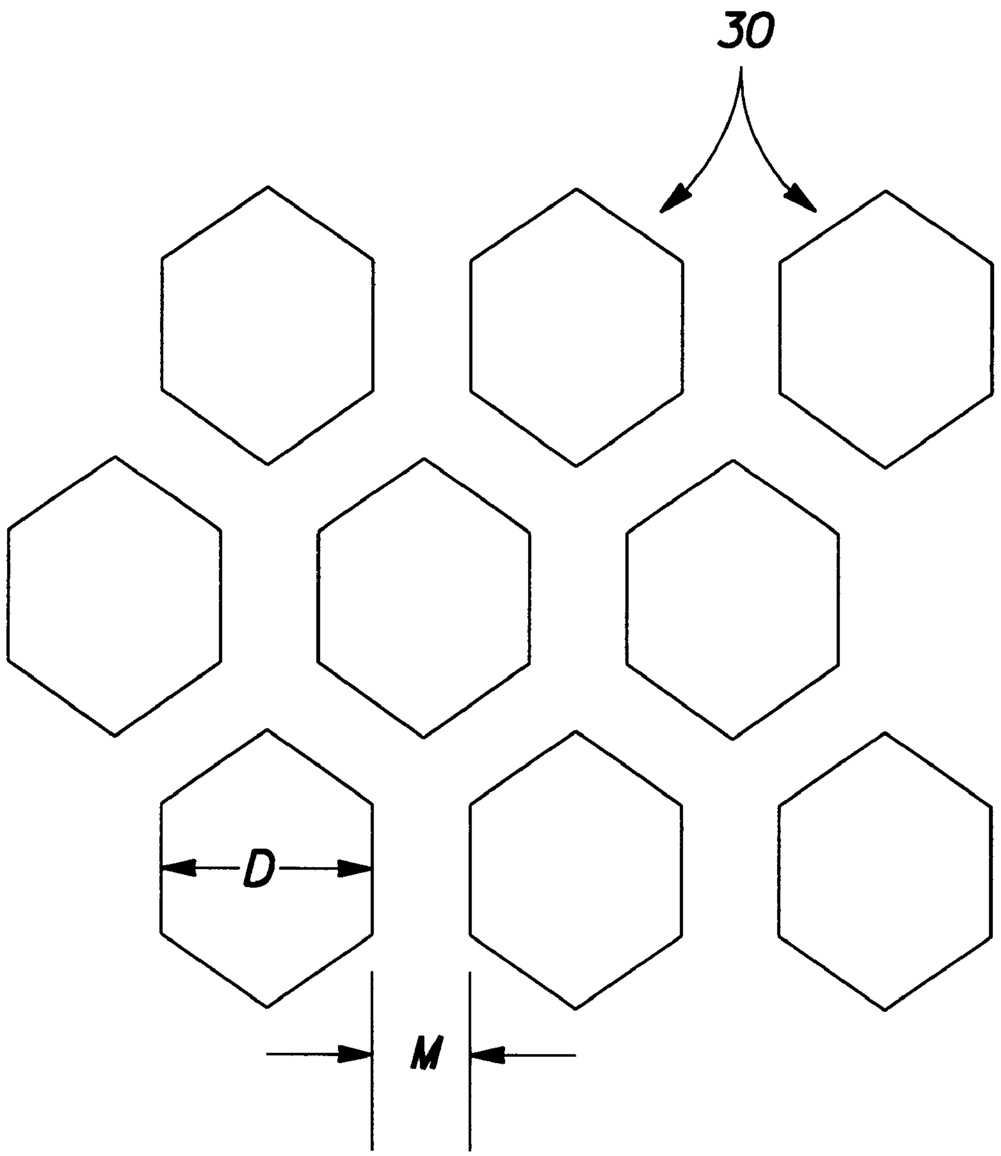
FIG. 5 is a schematic illustration of dimensions referenced in the pattern generation equations useful with the present invention.

After the coordinate system and maximum dimensions are specified, the next step is to determine the number of "nucleation points" which will become polygons desired within the defined boundaries of the pattern. This number is an integer between 0 and infinity, and should be selected with regard to the average size and spacing of the polygons desired in the finished pattern. Larger numbers correspond to smaller polygons, and vice-versa. A useful approach to determining the appropriate number of nucleation points or polygons is to compute the number of polygons of an artificial, hypothetical, uniform size and shape that would be required to fill the desired forming structure. If this artificial pattern is an array of regular hexagons 30 (see FIG. 5), with D being the edge-to-edge dimension and M being the spacing between the hexagons, then the number density of hexagons, N, is:

$$N = \frac{2\sqrt{3}}{3(D+M)^2}$$

It has been found that using this equation to calculate a nucleation density for the amorphous patterns generated as described herein will give polygons with average size closely approximating the size of the hypothetical hexagons (D). Once the nucleation density is known, the total number of nucleation points to be used in the pattern can be calculated by multiplying by the area of the pattern (80 $in^2$ in the case of this example).

A random number generator is required for the next step. Any suitable random number generator known to those skilled in the art may be utilized, including those requiring a "seed number" or utilizing an objectively determined starting value such as chronological time. Many random number generators operate to provide a number between zero and one (0–1), and the discussion hereafter assumes the use of such a generator. A generator with differing output may also be utilized if the result is converted to some number between zero and one or if appropriate conversion factors are utilized.

A computer program is written to run the random number generator the desired number of iterations to generate as many random numbers as is required to equal twice the desired number of "nucleation points" calculated above. As the numbers are generated, alternate numbers are multiplied by either the maximum X dimension or the maximum Y dimension to generate random pairs of X and Y coordinates all having X values between zero and the maximum X dimension and Y values between zero and the maximum Y dimension. These values are then stored as pairs of (X,Y) coordinates equal in number to the number of "nucleation points".

Figure 6:
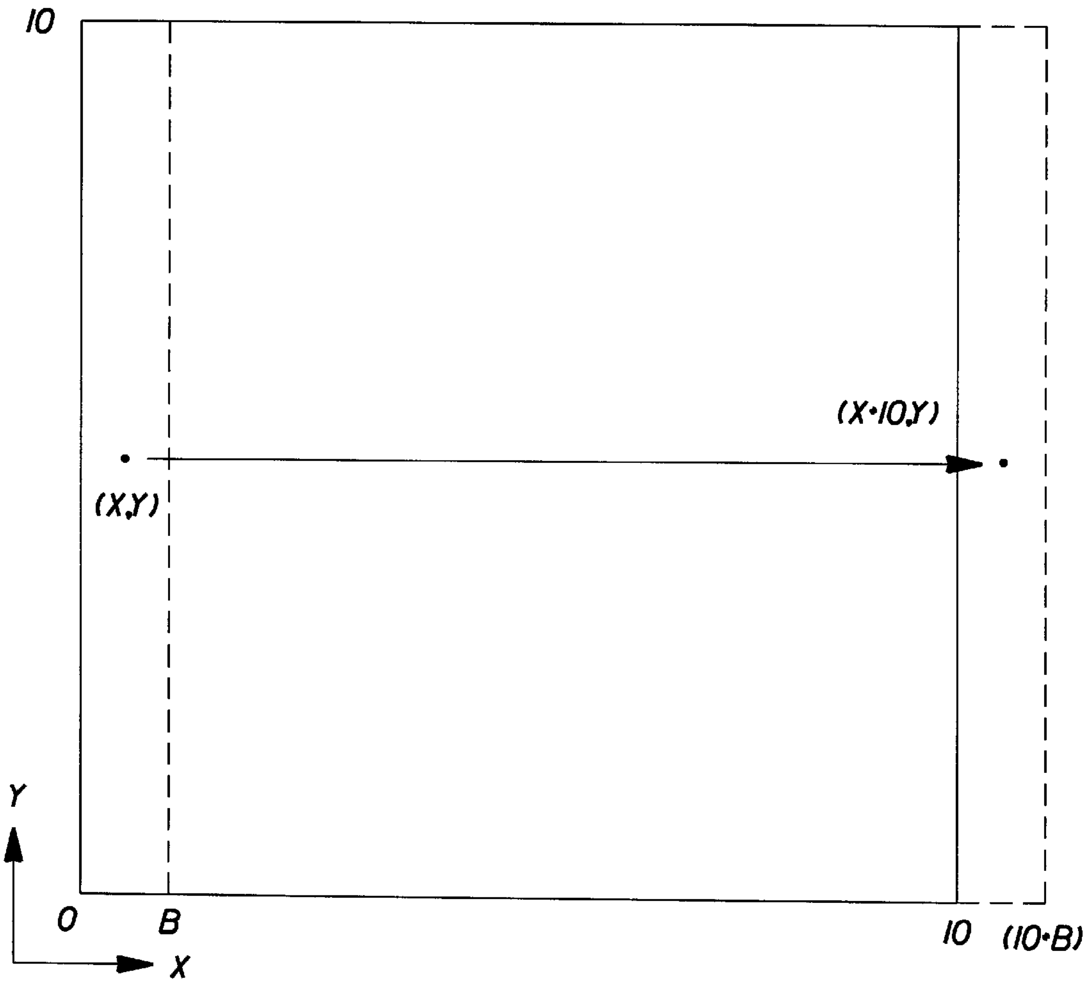
FIG. 6 is a schematic illustration of dimensions referenced in the pattern generation equations useful with the present invention.

It is at this point, that the invention described herein differs from the pattern generation algorithm described in the previous McGuire et al. application. Assuming that it is desired to have the left and right edge of the pattern "mesh", i.e., be capable of being "tiled" together, a border of width B is added to the right side of the 10" square (see FIG. 6). The size of the required border is dependent upon the nucleation density; the higher the nucleation density, the smaller is the required border size. A convenient method of computing the border width, B, is to refer again to the hypothetical regular hexagon array described above and shown in FIG. 5. In general, at least three columns of hypothetical hexagons should be incorporated into the border, so the border width can be calculated as:

$$B=3(D+H)$$

Now, any nucleation point P with coordinates (x,y) where x<B will be copied into the border as another nucleation point, P', with a new coordinate ($x_{max}$+x,y).

If the method described in the preceding paragraphs is utilized to generate a resulting pattern, the pattern will be truly random. This truly random pattern will, by its nature, have a large distribution of polygon sizes and shapes which may be undesirable in some instances. In order to provide some degree of control over the degree of randomness associated with the generation of "nucleation point" locations, a control factor or "constraint" is chosen and referred to hereafter as β (beta). The constraint limits the proximity of neighboring nucleation point locations through the introduction of an exclusion distance, E, which represents the minimum distance between any two adjacent nucleation points. The exclusion distance E is computed as follows:

$$E = \frac{2\beta}{\sqrt{\lambda\pi}}$$

where λ (lambda) is the number density of points (points per unit area) and β ranges from 0 to 1.

To implement the control of the "degree of randomness", the first nucleation point is placed as described above. β is then selected, and E is calculated from the above equation. Note that β, and thus E, will remain constant throughout the placement of nucleation points. For every subsequent nucleation point (x,y) coordinate that is generated, the distance from this point is computed to every other nucleation point that has already been placed. If this distance is less than E for any point, the newly-generated (x,y) coordinates are deleted and a new set is generated. This process is repeated until all N points have been successfully placed. Note that in the tiling algorithm useful in accordance with the present invention, for all points (x,y) where x<B, both the original point P and the copied point P' must be checked against all other points. If either P or P' is closer to any other point than E, then both P and P' are deleted, and a new set of random (x,y) coordinates is generated.

If β=0, then the exclusion distance is zero, and the pattern will be truly random. If β=1, the exclusion distance is equal to the nearest neighbor distance for a hexagonally close-packed array. Selecting β between 0 and 1 allows control over the "degree of randomness" between these two extremes.

In order to make the pattern a tile in which both the left and right edges tile properly and the top and bottom edges tile properly, borders will have to be used in both the X and Y directions.

Once the complete set of nucleation points are computed and stored, a Delaunay triangulation is performed as the precursor step to generating the finished polygonal pattern. The use of a Delaunay triangulation in this process constitutes a simpler but mathematically equivalent alternative to iteratively "growing" the polygons from the nucleation points simultaneously as circles, as described in the theoretical model above. The theme behind performing the triangulation is to generate sets of three nucleation points forming triangles, such that a circle constructed to pass through those three points will not include any other nucleation points within the circle. To perform the Delaunay triangulation, a computer program is written to assemble every possible combination of three nucleation points, with each nucleation point being assigned a unique number (integer) merely for identification purposes. The radius and center point coordinates are then calculated for a circle passing through each set of three triangularly-arranged points. The coordinate locations of each nucleation point not used to define the particular triangle are then compared with the coordinates of the circle (radius and center point) to determine whether any of the other nucleation points fall within the circle of the three points of interest. If the constructed circle for those three points passes the test (no other nucleation points falling within the circle), then the three point numbers, their X and Y coordinates, the radius of the circle, and the X and Y coordinates of the circle center are stored. If the constructed circle for those three points fails the test, no results are saved and the calculation progresses to the next set of three points.

Once the Delaunay triangulation has been completed, a Voronoi tessellation of 2-space is then performed to generate the finished polygons. To accomplish the tessellation, each nucleation point saved as being a vertex of a Delaunay triangle forms the center of a polygon. The outline of the polygon is then constructed by sequentially connecting the center points of the circumscribed circles of each of the Delaunay triangles, which include that vertex, sequentially in clockwise fashion. Saving these circle center points in a repetitive order such as clockwise enables the coordinates of the vertices of each polygon to be stored sequentially throughout the field of nucleation points. In generating the polygons, a comparison is made such that any triangle vertices at the boundaries of the pattern are omitted from the calculation since they will not define a complete polygon.

If it is desired for ease of tiling multiple copies of the same pattern together to form a larger pattern, the polygons generated as a result of nucleation points copied into the computational border may be retained as part of the pattern and overlapped with identical polygons in an adjacent pattern to aid in matching polygon spacing and registry. Alternatively, as shown in FIGS. 3 and 4, the polygons generated as a result of nucleation points copied into the computational border may be deleted after the triangulation and tessellation are performed such that adjacent patterns may be abutted with suitable polygon spacing.

Once a finished pattern of interlocking polygonal two-dimensional shapes is generated, in accordance with the present invention such a network of interlocking shapes is utilized as the design for one web surface of a web of material with the pattern defining the shapes of the bases of the three-dimensional, hollow protrusions formed from the initially planar web of starting material. In order to accomplish this formation of protrusions from an initially planar web of starting material, a suitable forming structure comprising a negative of the desired finished three-dimensional structure is created which the starting material is caused to conform to by exerting suitable forces sufficient to permanently deform the starting material.

From the completed data file of polygon vertex coordinates, a physical output such as a line drawing may be made of the finished pattern of polygons. This pattern may be utilized in conventional fashion as the input pattern for a metal screen etching process to form a three-dimensional forming structure. If a greater spacing between the polygons is desired, a computer program can be written to add one or more parallel lines to each polygon side to increase their width (and hence decrease the size of the polygons a corresponding amount).

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A high speed embossing and adhesive printing process, said process comprising the steps of:

(a) applying said adhesive to a first patterned embossing roll that is engaged with a second patterned embossing roll having a complementary pattern to said embossing roll;

(b) passing a web of sheet material adjacent to said first patterned embossing roll to apply said adhesive to said web;

(c) passing said web of sheet material between said first and second patterned embossing rolls at a tangential line speed to emboss said web of material, such that said adhesive forms an adhesive pattern between embossments.

2. The process of claim 1 further comprising the steps of:

(a) applying an adhesive to a roll;

(b) milling said adhesive to a reduced thickness through a series of metering gaps between a plurality of adjacent glue rolls; and, (c) applying said adhesive to said first patterned embossing roll.

3. The process of claim 1 further comprising the steps of:

(a) transferring said web of material from said second patterned embossing roll to said first patterned embossing roll; and, (b) stripping said web from said first patterned embossing roll.

4. The process of claim 1 further comprising the step of cooling said web of material after said embossing step.

5. The process of claim 4 wherein said cooling step includes contacting said web of material with a chilled roll.

6. The process of claim 1 wherein one or more of said first patterned embossing roll and said second patterned embossing roll are heated.

7. The process of claim 1 further comprising the step of:

(a) applying said adhesive to a heated glue application roll prior to said step of applying said adhesive to said first patterned embossing roll.

8. The process of claim 7 further comprising the steps of:

(a) applying an adhesive to a roll rotating at an initial tangential speed;

(b) milling said adhesive to a reduced thickness and accelerating said adhesive through a series of metering gaps between a plurality of adjacent glue rolls; and, (c) applying said adhesive to said glue application roll rotating at a tangential line speed that is higher than said initial tangential speed.

9. The process of claim 7 wherein said glue application roll is conformable.

10. The process of claim 7 wherein said adhesive is extruded from a slot die.

11. The process of claim 1 wherein said first patterned embossing roll is a female embossing roll and said second patterned embossing roll is a male embossing roll.

12. The process of claim 1 further comprising the step of:

(d) removing said web from said first patterned embossing roll.

13. The process of claim 12 wherein said web is removed from said first patterned embossing roll by a strip-off roll.

14. The process of claim 1 wherein said adhesive is a hot melt adhesive.

15. The process of claim 1 wherein said first patterned embossing roll includes a release coating thereon.

16. The process of claim 1 wherein said first patterned embossing roll includes an amorphous embossing pattern.

17. The process of claim 1 wherein said first patterned embossing roll includes a random embossing pattern.

18. The process of claim 1 wherein said first patterned embossing roll includes an isomorphic embossing pattern.

19. The process of claim 1 further comprising the step of passing said web proximate to a pressure roll after said web is embossed.

* * * * *